United States Patent [19]
Peroutka et al.

[11] 4,333,836
[45] Jun. 8, 1982

[54] CELLULAR DRUM FILTER FOR THE DEWATERING OF FIBER SUSPENSIONS

[75] Inventors: Fritz Peroutka, Heindenheim, Fed. Rep. of Germany; Helmut Hirschfelder, Sao Paulo, Brazil

[73] Assignee: Voith S.A., Brazil

[21] Appl. No.: 144,916

[22] Filed: Apr. 29, 1980

[30] Foreign Application Priority Data

Apr. 30, 1979 [BR] Brazil .................... 5900592[U]

[51] Int. Cl.$^3$ ............................... B01D 33/06
[52] U.S. Cl. .................................... 210/404
[58] Field of Search .............. 162/357, 368, 369; 210/402, 404, 406

[56] References Cited

U.S. PATENT DOCUMENTS

| | | | |
|---|---|---|---|
| 3,306,457 | 2/1967 | Putnam | 210/404 X |
| 3,363,774 | 1/1968 | Luthi | 210/404 |
| 3,409,139 | 11/1968 | Jackson et al. | 210/404 |
| 3,504,802 | 4/1970 | Luthi | 210/404 |
| 3,630,380 | 12/1971 | Barnebl et al. | 210/404 |

FOREIGN PATENT DOCUMENTS 576527 4/1933 Fed. Rep. of Germany.

*Primary Examiner*—Thomas G. Wyse
*Attorney, Agent, or Firm*—Ostrolenk, Faber, Gerb & Soffen

[57] ABSTRACT

A cellular drum filter for dewatering suspensions is disclosed, comprising trough means and a filter drum mounted to rotate partially submerged in a liquid suspension in the trough means. Vacuum suction is applied to the surface of the drum from the interior thereof via radial passages communicating preferably with respective axial channels leading to a control head. Each radial passage and each channel has a cross-section whose shape is an arcuate sector of an annulus.

23 Claims, 5 Drawing Figures

CELLULAR DRUM FILTER FOR THE DEWATERING OF FIBER SUSPENSIONS

BACKGROUND OF THE INVENTION

This invention relates to a cellular drum filter for the dewatering of fiber suspensions, and particularly relates to such a filter of the type including a trough for receiving the suspension and a filter drum rotatably supported in the trough in such a manner as to dip into the suspension therein. Vacuum suction is applied from within the filter drum to a portion of the drum's water pervious cylindrical surface, so that the liquid of the suspension is drawn through the drum, leaving a solid cake of fibers in the suspension on the outer surface of the drum.

Such drum filters are used primarily for the dewatering of fiber suspensions of pulp in the production of paper, cardboard, and the like. However, they can also be used in the sugar, chemical and cement industries, etc.

The vacuum suction can be produced, for instance, by the aspirating action of the water as it is discharged through a barometric tube, or by a vacuum pump. The vacuum suction is controlled by a valve arrangement located in each case over the part of the circumference of the drum from which the filtered, caked on material formed on the drum is removed, as a result of which atmospheric equalization of pressure takes place in that zone. It is known to connect a pipe to each of a plurality of suction cells underlying the cylindrical surface of the drum and to conduct all of the pipes to one end of the drum (or to conduct half of the pipes to each end). The vacuum suction is applied to a desired portion of the outer surface of the drum via pipes leading to the suction cells underlying that portion of the surface. A control head is disposed at one or both ends of the drum. It connects the pipes, to which suction is to be applied at any given time, with a common discharge pipe and with the vacuum suction producing device, and the control head covers the ends of the pipes to which suction is not then to be applied, to block application of the suction thereto. Such an apparatus includes an extremely large number of pipes, is difficult to manufacture, and is expensive. Access to the pipes is difficult, which is disadvantageous, particularly when it is necessary to repair leaks within the drum. In the event of a leak, the suspension liquid will pass into the interior of the drum. But this must be prevented because of the likelihood of corrosion. Immediate repair of a leak is therefore necessary. Furthermore, the frictional losses due to movement of the liquid in the pipes are relatively high.

SUMMARY OF THE INVENTION

The object of the present invention is to create a cellular drum filter of the aforementioned type that can be manufactured more rationally, and therefore more cheaply, than known cellular drum filters, that requires little maintenance, has low friction losses, and in which leaks can be left unrepaired for a long period of time.

According to the present invention, the connecting line passages, which correspond to the pipes in the known drum filter, have a cross-section which is the shape of an annular sector. The passages are preferably formed by radially-extending partition walls that are arranged in a fan pattern, that extend axially along a portion of the length of the drum, and that extend outward radially to suction cells just inside the pervious surface of the drum filter and to which the passages are connected. The partition walls also define axially-extending channels, of the same cross-sectional shape as the passages, leading to the control head or heads.

The cellular drum filter according to the invention can be manufactured in a simple and rational fashion. The passages inherently have extremely large cross-sections, so that even in the case of a very large drum, only one control head is necessary, although a control head can be provided at each end if this is preferred. Due to the large passage cross-sections, the liquid frictional losses are very slight, which is advantageous for the development of the greatest possible vacuum suction if a barometric tube is used for generating suction. The partition walls for the passages also contribute substantially to the greater rigidity of the drum.

In order to equalize the length of the flow paths and to make the strength of the vacuum suction uniform, the radial passages extending radially outwardly to the suction cells inside the pervious drum surface are located substantially midway between the ends of the filter drum.

Other objects and features of the invention will be apparent from the following description and the accompanying drawings, showing several embodiments which are presently preferred.

BRIEF DESCRIPTION OF THE DRAWINGS

FIG. 3 is a section of the hollow journal taken along the line III—III of FIG. 1.

FIG. 4 is a cross-sectional view of the control head along the line IV—IV of FIG. 1.

DESCRIPTION OF THE PREFERRED EMBODIMENTS

Figure 1:
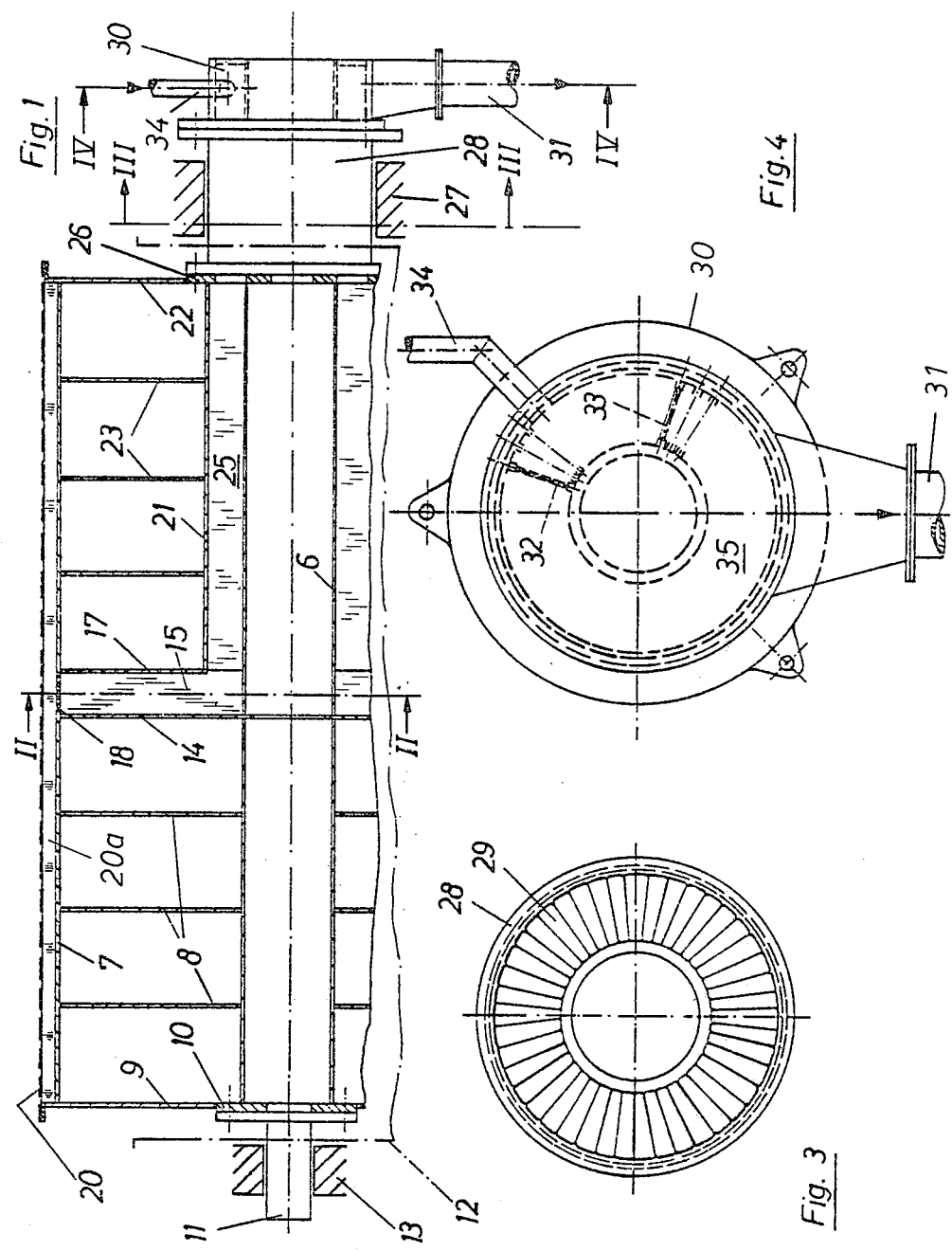
FIG. 1 shows in longitudinal section a cellular drum filter in accordance with the invention.

Referring to the left-hand half of FIG. 1, an axially elongated, cylindrical inner drum shell 7 is supported by an axially spaced apart array of annular discs 8 which are mounted on a central tubular drum shaft 6. One end wall 9 of the drum shell 7 carries at its center a flange holder 10 to which a journal 11 is screwed. The journal 11 is supported in a bearing 13 located outside the side wall of the trough 12 (indicated schematically). The other opposite end wall 22 of the drum shell carries a welded-on flange holder 26, to which is secured a hollow journal 28, and this journal is supported in bearing 27 outside the trough 12. A control head 30 is secured to the end of journal 28 that is remote from the drum. Control head 30 and hollow journal 28 are described in greater detail below.

Figure 2:
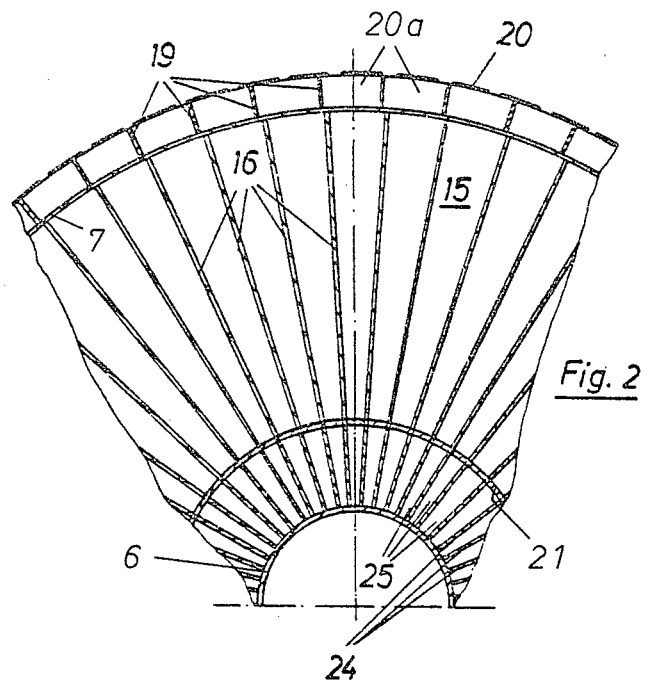
FIG. 2 is a section along the line II—II of FIG. 1 through the drum body.

Annular, axially spaced apart discs 14 and 17 are mounted toward the middle of and perpendicular to shaft 6. These discs define the opposite axial sides of a plurality of radial passages 15. The circumferential sides of the passages 15 are formed by walls 16 that extend radially out from shaft 6 (see FIG. 2) and that extend axially between discs 14 and 17. Between discs 14 and 17, the surface of the inner drum shell 7 is interrupted at 18 to allow application of vacuum suction to suction cells 20a, described below via passages 15. On the outer surface of inner drum shell 7, there are arranged radial ribs 19, which are distributed around the circumference of and are parallel to the axis of the drum 7. The ribs extend the full length of the shell 7. The ribs 19 support an annular, pervious outer drum shell 20 which also is supported by drum end walls 9, 22. The drum shell 20 preferably has a wire cloth screen arranged over it. Ribs 19 divide the annular region between the drum shells 7 and 20 into a plurality of dewatering suction cells 20a. The ribs 19 are preferably so placed as to substantially align with respective walls 16, whereby each suction cell 20a communicates through the respective interrupted section 18 with a respective passage 15. The suction cells 20a assure that solid, dewatered suspension, i.e. the fibers thereof will cake on and deposit on the wire cloth screen.

Extending axially between disc 17 and end wall 22 of drum shell 7, there is a pipe 21 which is coaxial with and radially outside the inner drum shaft 6. Pipe 21 defines a central, annular passage connecting the radial passages 15 to a source of vacuum suction, as will be described below. The inner drum shell 7 is supported on the pipe 21 by annular discs 23. Partition walls 24 extend radially between shaft 6 and pipe 21, extend axially along shaft 6 between disc 17 and end wall 22, are equally spaced around the circumference of shaft 6 and are respectively aligned circumferentially with the walls 16, whereby each radial passage 15 is aligned with and is continuous with a corresponding respective axially extending channel 25 defined between pipe 21 and drum shaft 6.

As noted above, a hollow journal 28, supported in bearing 27, is secured to flange holder 26 which is welded to end wall 22. The bearing 27 is placed outside the wall of trough 12. Journal 28 is shown in cross-section in FIG. 3. Journal 28 has axially extending channels 29 each of which is aligned with a respective one of the channels 25.

A control head 30, which is shown in FIG. 4, is placed against the end of the journal 28 in known manner. A barometric tube 31 for drainage of the filtrate from the drum is connected to the control head 30. Within the control head 30 there are radially extending barrier walls 32 and 33 that extend axially across the control head and thereby define a circumferentially larger zone 35 in the control head. The walls 32 and 33 can be displaced circumferentially around the control head by known means for changing the angular size and position of zone 35. Vacuum suction in the control head is created by the application of negative atmospheric pressure to pipe 34. Only those of the channels 29 in the journal 28 which are located at a given instant in the zone 35 of the control head 30, which is outside the area blocked off between barrier walls 32 and 33, are acted on by the vacuum.

When negative air pressure is applied to pipe 34, air is drawn thereby from each affected suction cell 20a, through the respective radial passage 15 communicating with the cell 20a, through the corresponding channel 25 of the central passage defined by pipe 21, through the corresponding journal channel 29 and through the chamber 35 of control head 30. As a result, the liquid of the suspension is drawn in through the pervious outer drum shell 20, which filters out the suspended material. The suction holds the filtered out fibers of the suspension and these cake up against the outer surface of outer drum shell 20. The filtered liquid traverses passages 15, 25 and 29 and is drained out through tube 31. No suction is applied to those suction cells 20a whose corresponding journal channels 29 are blocked by the closed chamber between the barrier walls 32, 33 in the control head.

Figure 5:
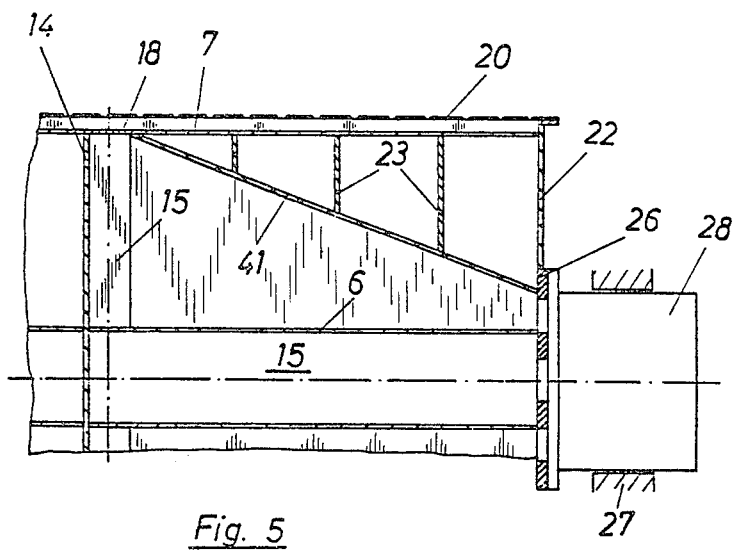
FIG. 5 shows a view corresponding to FIG. 1 of an alternative embodiment of the cellular drum filter.

In the alternative embodiment shown in FIG. 5, a conically shaped pipe 41 replaces the cylindrical pipe 21 of the embodiment of FIG. 1. The partition walls 24 (see FIG. 2) extend from the shaft 6 outward to the pipe 41 and form channels which taper radially in the direction toward the end wall 22.

Radial passages 15 need not be located at the middle of the drum, as in FIGS. 1 and 5, but may instead be located at any point or points along the axial length of the drum. For example, it is possible to arrange such passages at one or both ends and, if desired, to dispense with the central radial passages 15.

The cellular drum filter of the invention is simple in construction. Frictional losses occurring in its operation are small, due to the relatively large cross-section of each channel or passage, and leaks in the drum can be left unrepaired for a relatively long time without serious damage to the apparatus.

Although several preferred embodiments of the invention have been described in detail, many modifications and variations thereof will now be apparent to one skilled in the art. Accordingly, the scope of the present invention is to be limited not by the details of the preferred embodiments herein described but only by the terms of the appended claims.

What is claimed is:

1. A cellular drum filter for the dewatering of suspensions, comprising;

a filter drum; support means for supporting said filter drum for rotation;

said filter drum comprising:

an outer drum shell which is pervious to liquid and which has an inner surface;

suction cell forming means cooperating with and opposed to said inner surface of said outer drum shell for defining a plurality of hollow suction cells located radially inward from said outer drum shell inner surface; and suction means for applying suction to said suction cells; said suction means comprising a first passage within said filter drum and a device for applying suction to said first passage;

said suction means also comprising a plurality of radial passages disposed inside said drum radial passage communicating at the radially outward end thereof with at least one said suction cell; each said radial passage also communicating with said first passage;

said suction means further comprising a control head disposed between said suction applying device and said first passage; said control head including radial passage selection means for permitting and prohibiting suction communication between said suction applying device and each of said radial passages in accordance with the predetermined angular positions of said drum;

said support means further comprising a hollow journal mounted at one end of said filter drum, said control head being operatively connected to said journal, said journal being configured to define second passages communicating between said control chamber and said channels of said first passage;

each said radial passage having a cross-section, in a plane perpendicular to the axis of rotation of said filter drum, with the general shape of a sector of a circle.

2. The cellular drum filter of claim 1, wherein said first passage comprises a plurality of channels each also having a cross-section, in a plane perpendicular to the axis of rotation of said filter drum, with the general shape of a sector of a circle; each said radial passage communicating with at least one said channel of said first passage.

3. The cellular drum filter of claim 2, wherein said first passage comprises a central passage extending centrally through said filter drum.

4. The cellular drum filter of either of claims 2 or 3, wherein said radial passages are located substantially at the middle of the axial length of said filter drum.

5. The cellular drum filter of claim 3, wherein said first passage is generally conical.

6. The cellular drum filter of claim 3, wherein said suction cell forming means comprises an inner drum shell radially spaced from said outer drum shell.

7. The cellular drum filter of claim 3, wherein said first passage is generally cylincrical.

8. The cellular drum filter of claim 2, wherein said channels are so shaped and positioned that a respective said channel communicates with each said radial passage.

9. The cellular drum filter of either of claims 2 or 6, wherein said control head comprises a chamber communicating with said first passage and a suction pipe for applying suction force to said chamber, whereby suction can be produced in said first passage via said chamber;
adjustable barrier means disposed between said suction pipe and said first passage; said adjustable barrier means being adjustable in position to block the application of suction through a first selected group of said channels of said first passage and for thereby blocking application of suction to a first plurality of said radial passages, while permitting application of suction force through another selected group of said channels for permitting application of suction to another plurality of said radial passages.

10. The cellular filter drum of claim 2, wherein said radial passages are each defined by and they are separated from each other by respective annularly spaced apart, radially extending first walls; said channels also being defined by a plurality of annularly spaced apart, radially extending second walls; each of said second walls being continuous with a respective one of said first walls.

11. The cellular drum filter of either of claims 8 or 10, wherein said channels are equal in number to said radial passages and each of said channels is continuous with a respective one of said radial passages.

12. The cellular drum filter of claim 11, further comprising a plurality of ribs between said outer drum shell and said suction cell forming means for defining there said suction cells; said ribs extending axially along and radially inward from said inner surface of said outer drum shell; each said suction cell being in communication with a respective said radial passage.

13. The cellular drum filter of either of claims 1 or 2, wherein said radial passages are each defined by and they are separated from each other by a plurality of annularly spaced apart walls extending radially across the space defined inside said suction cell forming means and said walls extending axially of said filter drum.

14. The cellular drum filter of claim 13, further comprising a plurality of ribs between said outer drum shell and said suction cell forming means for defining there said suction cells; said ribs extending axially along and radially inward from said inner surface of said outer drum shell; each said suction cell being in communication with a respective said radial passage.

15. The cellular drum filter of claim 14, further comprising trough means through which said drum filter rotates, whereby suspension in said trough means may be held by suction to said drum filter outer drum shell.

16. The cellular drum filter of either of claims 1 or 2, further comprising a plurality of ribs between said outer drum shell and said suction cell forming means for defining there said suction cells; said ribs extending axially along and radially inward from said inner surface of said outer drum shell.

17. The cellular drum filter of claim 16, further comprising trough means through which said drum filter rotates, whereby suspension in said trough means may be held by suction to said drum filter outer drum shell.

18. The cellular drum filter of either of claims 1 or 2, wherein said support means comprises a shaft extending through said filter drum and said inner drum shell is supported by a plurality of annular discs mounted on said shaft.

19. The cellular drum filter of either of claims 1 or 2, further comprising two axially spaced apart annular discs inside said suction cell forming means for defining the axial ends of said radial passages between them.

20. The cellular drum filter of claim 19, wherein said radial passages are each defined by and they are separated from each other by a plurality of annularly spaced apart walls extending radially and extending generally perpendicular to said annular discs.

21. The cellular drum filter of claim 19, wherein said support means comprises a shaft; said two annular discs being secured to said shaft; said first passage being a central passage extending centrally through said filter drum and being defined around said shaft.

22. The cellular drum filter of claim 1, wherein said control head comprises a chamber communicating with said first passage, a suction pipe for applying suction force to said chamber, whereby suction can be produced in said radial passages via said chamber; said radial passage selection means comprises adjustable barrier means disposed between said suction pipe and said first passage; said adjustable barrier means being adjustable in position to block the application of suction through a first selected portion of said first passage, and for thereby blocking application of suction to a first plurality of said radial passages, while permitting application of suction force through another selected portion of said first passage.

23. The cellular drum filter of either of claims 1 or 22, further comprising trough means through which said drum filter rotates, whereby suspension in said trough means may be held by suction to said drum filter outer drum shell.

* * * * *